Aug. 11, 1925.
H. C. MERRILL
1,549,595
METHOD OF AND MACHINE FOR MARKING FRUIT
Filed Nov. 5, 1923
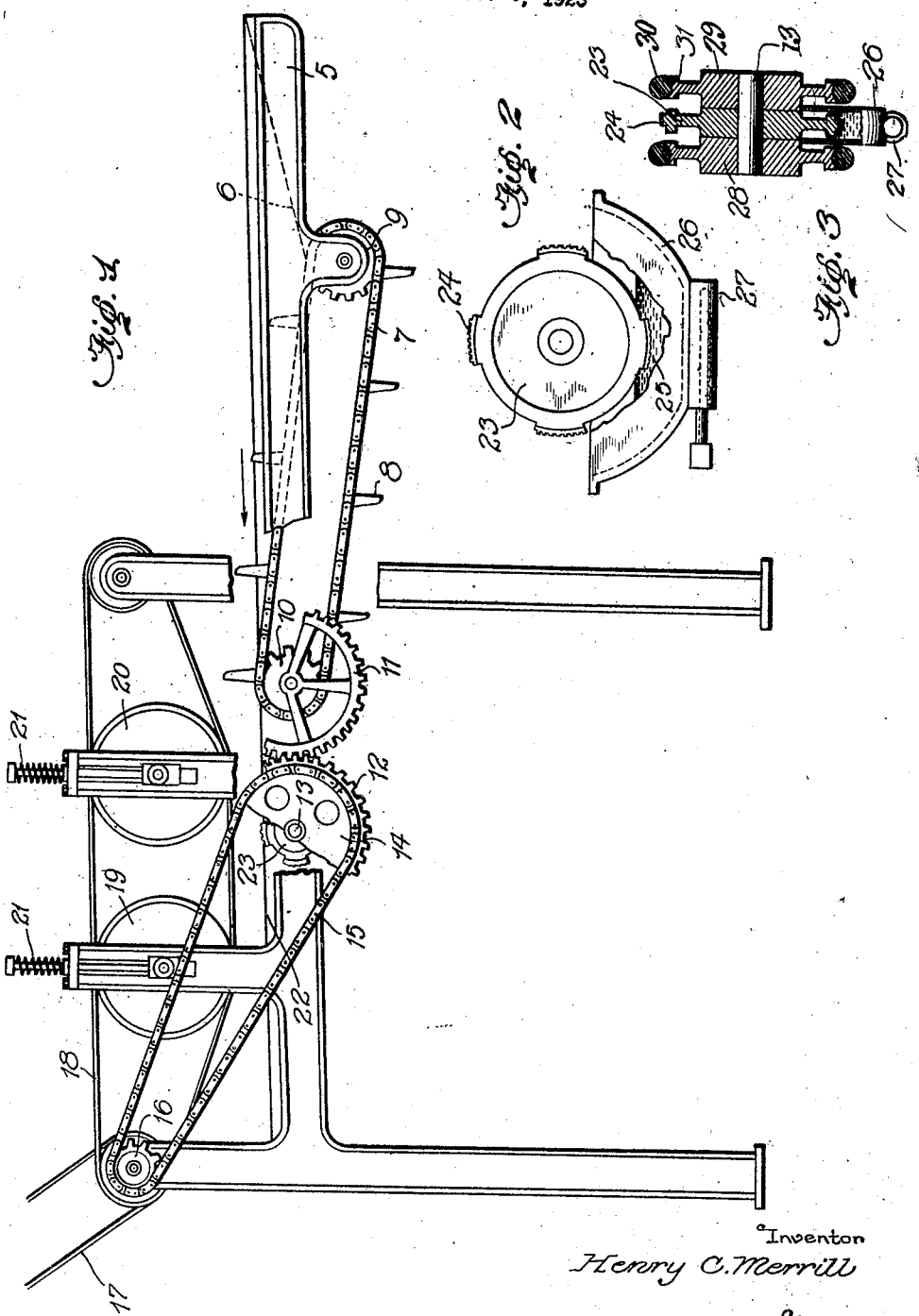
Inventor
Henry C. Merrill
By Wilkinson & Giusta
Attorneys Patented Aug. 11, 1925.

1,549,595

UNITED STATES PATENT OFFICE.

HENRY CHASE MERRILL, OF TROPIC, FLORIDA, ASSIGNOR TO FLORIDA CITRUS EXCHANGE, OF TAMPA, FLORIDA, A CORPORATION OF FLORIDA.

METHOD OF AND MACHINE FOR MARKING FRUIT.

Application filed November 5, 1923. Serial No. 672,923.

*To all whom it may concern:*

Be it known that I, HENRY C. MERRILL, a citizen of the United States, residing at Tropic, in the county of Brevard and State of Florida, have invented certain new and useful Improvements in Methods of and Machines for Marking Fruit; and I do hereby declare the following to be a full, clear, and exact description of the invention, such as will enable others skilled in the art to which it appertains to make and use the same.

The present invention relates to improvements in methods of and machines for marking fruit and has for an object to provide for the effective imprinting of marks directly upon the skin of the fruit in such a way as to indelibly secure the impression without however in any way injuring the skin or lessening the protective value thereof.

Another object of the invention resides in providing an improved method of marking the fruit in which the ink used to make the marking is heated itself, instead of following the prior practice of heating the die. In heating the die, a complicated construction is required, the maintenance is high on account of the large area and the cross sectional mass to be heated, whereas it is only necessary to heat the die surface itself.

According to the invention the construction of the die is simple as it is devoid of heating elements and by heating the ink directly the cost of the heating is greatly reduced while more beneficial results are produced inasmuch as the heated ink will penetrate to a greater extent than cold ink and the impression will be sharper and more clearly defined.

A further object of the invention resides in providing a simple, compact and inexpensive machine for accomplishing the marking of fruit and the like in accordance with the method above outlined.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side view of an improved fruit marking machine, Figure 2 is an enlarged side view with parts broken away showing the die and ink well, and Figure 3 is a vertical section therethrough taken at substantially right angles to Figure 2.

Referring more particularly to the drawing and for the present to Figure 1, 5 designates generally the framework of the machine constructed according to the present invention and for carrying out the method described in connection therewith; and 6 designates an inclined runway or trough for oranges or other like fruit. The oranges are directed by this runway on to a conveyor 7 having lugs 8 to catch and move the fruit along in the direction indicated by the arrow. The conveyor moves about sprocket wheels 9 and 10 and is driven by the gear wheel 11 associated with the sprocket wheels 10 or by other appropriate means.

The gear wheel 11 meshes with a similar gear wheel 12 upon a die shaft 13. The sprocket wheel 14 carried upon this same shaft is engaged by a drive chain 15 which receives its movement from a small sprocket 16 upon one end of the frame. A belt and pulley 17 are arranged to drive the sprocket 16.

This same source of power is adapted to drive the belt 18 which is mounted at its ends about the pulleys as shown and has its intermediate portion engaged by large idle rollers 19 and 20 which are urged downwardly by pressure from the springs 21.

The lower run of the belt 18 between the spring pressed rollers 19 and 20 is adapted to receive the upper sides of the fruit and to urge such fruit downwardly upon the table 22 through which projects the die wheel 23. The fruit is thus pressed downwardly upon the dies carried by the die wheel 23 and impressions are made as the fruit is rolled along the table 22. The movement of the fruit is accomplished by the movement of the belt 18.

Now the die wheel is shown more particularly in Figures 2 and 3 and as shown this preferably consists of a solid wheel made fast upon the die shaft 13 and the wheel carries at its periphery a number of dies 24, shown in Figure 2 to be four in number although they may be of a greater or less number. These dies have appropriate surfaces for imparting to the skins of the fruit the necessary marking and the surfaces preferably consist of rather sharply defined cutting surfaces for making a sharp outline in the fruit. The dies rotate in a bath of ink 25 contained in the well 26. Beneath the well and preferably at the central bottom portion thereof is a resistance coil 27 adapted to heat the body of the ink. The ink well or pan 26 is of a narrow construction having sides which fit close to the side portions of the die wheel and consequently a rather narrow column of ink is held in the wheel and the resistance coil is particularly adapted for heating this body as the coil substantially extends beneath the entire length and width of the pan. The pan has flaring sides as indicated in Figure 2 of substantially semicircular shape to conform generally to the character of the type wheel and consequently the ink heated at the base of the coil will ascend directly upwards to the die in the bath whereby the hottest portion of the ink will be delivered to the die. As the ink cools off at the surface it will be displaced from the central portion of the wheel by the ascending currents of hot ink and as the ink cools further at the surface on both sides of the wheel it will descend downwardly guided by the sloping walls of the wheel to replace the ascending heated ink.

In this way substantially two currents flowing in opposite directions and meeting at the bottom of the well will result keeping the entire body of the ink in a state of motion and agitation and prevent the pigment from settling to the bottom. A good quality of ink will constantly be presented to the dies. Only a small body of ink having a narrow cross section in a transverse direction is provided so that the cost of heating the same is very small, particularly as compared with the cost of heating the entire die wheel 23. The ink of course will conduct a certain amount of heat to the die surfaces necessary for causing a sharp impression to be made and the fineness of the die surfaces enables me to raise these surfaces to a slight temperature over the normal condition of the die wheel, which raised temperature, in combination with the heated ink, will combine to secure easy and sharp penetration of the fruit skin, enabling at the same time the fruit skin to acquire a rather deep indelible imprint with only shallow die surfaces which will have no possible chance of injuring the fruit by either directly destroying the skin or by allowing the ink to penetrate too far thereinto.

Now the die wheel 23 is preferably flanked by a pair of riding wheels 28 and 29 having cushioned rims 30 provided for instance by rubber rings which extend about and fit in grooves 31 provided in the wheels. These rings extend outwardly beyond the die wheel or beyond the outer edge thereof and they form with the die wheel a trough corresponding in general shape to the contour of the fruit. This will enable the fruit skin to be pressed against the die by the belt 18 but the cushion elements 30 will also have an opposite tendency in order to prevent the fruit being mashed down upon the die or allowing the pressure to become so great as to cut through a thin fruit skin. These rubber elements act as protections and they also center and guide the fruit so that the impression is made directly and at right angles and not by a diagonal or glancing blow upon the fruit. In this way the impression secured is bound to be uniform.

The machine, it will be noted insures that an impression of the die is made on each piece of fruit passing over the die. The conveyor lugs are timed with the rotated die so that each individual fruit is presented to the conveyor belt at the correct position to reach the die at a time when such die is in proper position to make an impression on the skin of the fruit.

The die rotates in the opposite direction to the conveyor belt, as will be clear from the arrangement and the disposition of the gearing; the speed of rotation of the die being much slower than the conveyor belt resulting in the travel of the fruit through the machine being retarded while on the die and allowing the die wheel ample space to rotate far enough to assure a full impression on the skin of the fruit.

The overhead conveyor belt, which performs the function of passing the fruit through the machine, also gives the fruit the necessary pressure directly upon the die to receive the full and clear cut impression of said die.

The conveyor belt is adjustable upwards or downwards to accommodate itself to fruit of various sizes.

It is obvious that various changes and modifications may be made in the details of construction and design of the above specifically described embodiment of this invention without departing from the spirit thereof, such changes and modifications being restricted only by the scope of the following claims:

What is claimed is:—

1. The herein described method of marking fruit which consists in directly heating a bath of ink, rotating a die wheel through said heated bath of ink to enable the wheel to acquire substantially the heat of said bath, and subjecting the fruit to pressure against the heated and inked dies of the die wheel.

2. The herein described method of marking fruit which consists in heating a bath of ink, rotating a die wheel through the bath of ink whereby to acquire substantially the heat of the bath and a quantity of the ink and forcibly rolling the fruit past and against the heated and inked dies while yieldably supporting the fruit at the sides of the die wheel leaving the fruit free from support at the ends of the wheel to permit free rolling movement of the fruit.

3. A device for marking fruit comprising a rotary die wheel having a number of dies thereon at spaced points, means for forcibly rolling the fruit along past the die wheel and into contact with said dies, a reservoir for ink disposed directly below the die wheel into which the dies are adapted to dip, heating means for the ink reservoir directly beneath said wheel, and said reservoir, and means rotating with said die wheel and disposed outside of said reservoir for forming a trough with the die wheel.

4. A device for marking fruit comprising a rotary die wheel having dies thereon, rotary cushion wheels, one at each side of said die wheel extending beyond the perimeter of the dies for forming a compressible trough to guide the fruit at right angles against the dies, a narrow ink reservoir having its side walls extending between the cushion wheels and enveloping the said die wheel and means in the reservoir to heat the body of ink therein.

5. A device for marking fruit comprising a table, along which the fruit is adapted to be advanced, a rotary die wheel having dies adapted to project up through the table, means for rolling the fruit along the table past said die wheel, means for rotating said die wheel, and ink reservoir beneath the table and directly beneath said die wheel for holding a body of ink, into which the dies may successfully dip, said reservoir having outwardly flaring walls and heating means at the base of the reservoir directly beneath the die wheel for creating upwardly rising convection currents directly beneath the dies and the sloping walls adapted to guide the cooled ink down toward the heating means at the bottom.

6. A device for marking fruit comprising a table, a rotary die wheel having dies thereon mounted beneath and extending up beyond the surface of the table, means for rotating said die wheel, yieldable pressure means above the die wheel for rolling fruit along and against the dies on the wheel, guide wheels carried at opposite sides of said die wheel and fixed to move therewith, said die wheels having cushion guiding means at the peripheral edges thereof extending beyond the dies to receive and guide the fruit at substantially right angles against the dies, and a reservoir for holding ink directly in contact with said die wheel, without inking the guiding means.

HENRY CHASE MERRILL.